Figure 1:
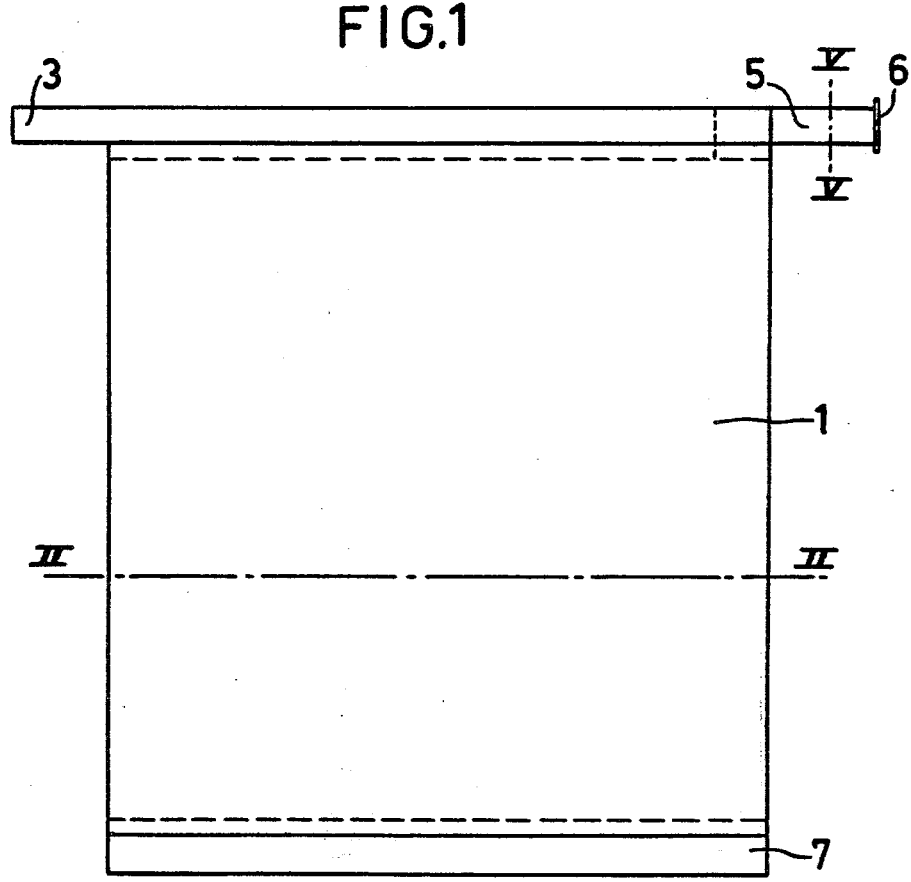

United States Patent [19]  [11] 4,256,586
Röos et al. [45] Mar. 17, 1981

[54] FRAME FOR BAG-TYPE FILTERS

[75] Inventors: Bertil Röos, Stenungsund; Anders Ullman, Ljungaverk, both of Sweden

[73] Assignee: Perma Scand AB, Ljungaverk, Sweden

[21] Appl. No.: 32,892

[22] Filed: Apr. 24, 1979

[30] Foreign Application Priority Data

Oct. 30, 1978 [SE] Sweden ................................ 7811208

[51] Int. Cl.³ ...................... B01D 25/04; B01D 46/10
[52] U.S. Cl. ................................... 210/487; 210/489; 210/498; 55/525
[58] Field of Search ............... 210/231, 486, 487, 488, 210/489, 493, 498, 541, 461, 483, 490, 492; 55/525

[56] References Cited

U.S. PATENT DOCUMENTS

| 2,274,684 | 3/1942 | Goodloe | 55/525 |
| 2,778,096 | 1/1957 | Weema | 210/541 |
| 3,086,624 | 4/1963 | Wyatt | 55/528 |
| 3,113,102 | 12/1963 | Schulze | 210/493 |
| 3,242,655 | 3/1966 | Rivers | 210/493 |
| 3,948,779 | 4/1976 | Jackson | 210/331 |

FOREIGN PATENT DOCUMENTS

| 253980 | 11/1912 | Fed. Rep. of Germany | 55/525 |
| 10940 | 7/1916 | United Kingdom | 210/489 |
| 253606 | 6/1926 | United Kingdom | 55/525 |

OTHER PUBLICATIONS

Perry's Chemical Engineers Handbook, R. H. Perry et al., Mc-Graw Hill Book, Co., N.Y., 1973, 5th Edition, pp. 23-35.

Primary Examiner—Charles N. Hart
Assistant Examiner—David R. Sadowski
Attorney, Agent, or Firm—Fred Philpitt

[57] ABSTRACT

Filter frame (1), intended to be inserted in filter cloths of flexible materials shaped as bags, which bags during filtration are percolated by the treated fluid from the outside and inwards, the frame comprising two perforated and corrugated plates (2) placed against each other so that the ridges of one plate are in contact with the valleys of the other plate and linear contact between the plates is formed and between which lines and the surfaces of the plates channels for the filtrate are formed and an outlet (5) for collecting the filtrate, whereby the outlet opens out into one of the channels. The perforations are, in order to obtain a good flexibility and separating effect, formed as holes in a net of expanded metal.

2 Claims, 6 Drawing Figures

U.S. Patent   Mar. 17, 1981   Sheet 1 of 2   4,256,586

FRAME FOR BAG-TYPE FILTERS

The present invention relates to a frame for bag-type filters made of flexible filter material and more particularly it relates to a filter frame for bag filter constructions of the type where the treated fluid is intended to flow through from outside to the interior, and thus is equipped with a spacer designed as a frame, in order to maintain a space between the surfaces of the bag.

Bag filters of this type are to a great extent used in the chemical industry as they are simple, fairly cheap and reliable in service. Depending on the pattern of flow, separated material accumulates on the exterior of the bag and can be removed periodically by reverse flushing, air blowing or mechanical scraping. After such cleaning the filter bag can be used again directly and it is easy to take care of the detached filter cake and remove this, or work it up separately. Since the cleaning procedure is fairly simple and of a short duration, the filters are particularly suited for applications wherein a high processing capacity is required and for continuous processes wherein as short non-productive times for cleaning as possible are required.

Although filter designs of this type are principally simple there are, however, quite a few construction problems that are difficult to master. The filter frame must be designed to withstand considerable compressing strain. The fall of pressure across the filter is great, particularly at fluid filtration, and the strength of the spacing element becomes a limiting factor for the flow speed and for the thickness of the filter cake that can be allowed before cleaning, and thus for the actual capacity of the filter. Although the filter frame is of great mechanical strength it must be flexible to subject the filter cloth to variable stresses during filtration, shutting-off and reverse flushing, in order to facilitate release of the filter cake from the cloth during the cleaning. To avoid frequent replacements of the filter cloth, the element must also have such a shape that it can carry stretching of the cloth due to aging with maintained filtering effect. The filter frame must not have any sharp edges which may damage the cloth, neither is it allowed to have such a shape that too sharp edges can be formed thereon by the filtration pressure. The frame must further provide a good interior circulation environment for the filtrate after penetration of the filter cloth, and forwards to and through the outlet from the inner of the filter, so that unnecessary pressure drops will not arise and a non-uniform use of the bag-surfaces will diminish the filtering capacity. The filter material must be designed to have tight seams, and with respect to the spacing element, to be easily fitted on and taken off this and efficiently sealed against the outlet from the interior of the bag, as a flow of unfiltered liquid, passing to the clean filtrate flow, generally cannot be accepted. The construction should further be simple and of a low production cost, it should offer a larger filtering area in a small space, it should be easy to take out from and fit into the pressure vessels where the filters are arranged, and finally it should be made of materials which can withstand the working environment which is often corrosive.

A number of bag filter designs have been suggested to solve these general construction problems, besides those particular problems connected with each application in question. In filtering applications wherein the demands on capacity are great and wherein the flows are difficult to filter, such known constructions have been found particularly suitable which have a filter frame of two perforated plates which have been corrugated and placed with respect to each other in such a manner that the valleys of one are in contact with the ridges of the other, so that a linear contact between the corrugated plates is formed. These constructions give, among other things, a very good stability against pressure forces and they maintain their filtering capability even at a great accumulation of difficult to filter, sludge materials.

Such design is disclosed in the U.S. Pat. No. 3,948,779, and this construction comprises two perforated plates arranged as has been described above and from which construction it is intended to remove separated material by means of air blow. The design is however not intended to be cleaned by reverse flushing and the design is unsuitable for this depending on, among other things, the selected perforated plates, their undulations and the adaptation of the filter cloth.

The British Pat. No. 10940/1915 gives another example, and shows a bag filter design comprising corrugated nets of expanded metal in the frame structure. As in this construction additional spacing elements have been used instead of direct contact between the nets, the above mentioned principles for obtaining good stability are poorly taken advantage of and thus the capacity is also poorly utilized. Nor is this construction intended or suited for cleaning by reverse flushing, and suitable flexibility for this is absent, despite the utilization of an expanded metal which otherwise is a suitable material for obtaining such properties.

The present invention relates to an improved filter frame construction of the type which is intended to be placed in filter cloth of a flexible material designed as bags and through which the treated fluid flows inward during filtration, said frame comprising two perforated and corrugated plates which are placed, with respect to each other in such a manner that the ridges of one plate are in contact with the valleys of the other plate whereby a linear contact between the plates is formed and channels for the filtrate are formed between the lines and the surfaces of the plates and also an outlet, opening out into at least one of the channels, for collecting the filtrate.

The perforations of the plates are according to the invention formed as the apertures in a net of expanded metal.

According to a particularly preferred embodiment the plates are joined by welding, preferably spot welding, along the contact lines of the plates.

According to another preferred embodiment the channels for the filtrate in the frame are mutually connected at the edge of the frame which is perpendicular to the channels, via a space limited by a trough affixed to the edge and into which space the outlet pipe opens.

According to a further preferred embodiment the material of the plates is titanium.

Use of a net of expanded metal in a construction according to the invention is advantageous in many respects. A perforated plate in which the apertures have been punched or formed in a similar manner cannot be longitudinally stretched or compressed to any appreciable degree. A net of expanded metal, on the other hand, has apertures which have been formed by slitting and stretching of the plate, and can thus, subjected to stretching or compressive forces in the plane of the plate, be stretched or compressed to a higher degree than plates having other types of perforations and this without any substantial change of the pattern and without formation of folds on the plate. In a frame construction according to the invention wherein the plates are corrugated and placed against each other, a plate of expanded metal can thus carry substantially greater forces and maintain its flexibility much better than other kinds of perforated plates. This is obtained simply by the closing of the apertures somewhat under load and this flexibility is obtained without any essential change of the external dimensions of the frame which is a considerable advantage. When the pressure is unloaded, the frame resumes its original shape and the movements make the filter cake come off the cloth more easily. The holes in a net of expanded metal further have such a structure that the filter cloth easily comes loose at reverse flushing and also gives a satisfactory percolation of the fluid. Owing to the strength and the flexibility, the area of the apertures can be made large. To obtain this effect it is, as has been mentioned, required that the plates are placed against each other for obtaining a linear support.

Welding, and particularly spot welding, along the contact lines is preferred as this gives a stable construction and the least effect on both the flexibility and the percolation of the filtrate through the frame.

A space for collecting the filtrate in the form of a trough, fixed to one of the edges of the frame which are perpendicular to the channels, is preferred as it gives a good flow of the filtrate in the frame without blockages and thus a uniform utilization of the capacity of the filter surface. A trough of this kind also contributes to stabilizing the external dimensions of the frame at pressure load and gives an end part which spares the filter cloth. If also the trough is made of perforated plate, and preferably of expanded metal, the entire surface of the filter bag will be used for filtration without decrease of the stability.

Titanium metal is preferred for the construction as this material has a good resistance in corrosive environments, particularly when used in the chlorine/alkali industries. It has, however, also been found that it confers a good flexibility in a construction according to the invention and that it easily can be shaped to a net of expanded metal and be spot welded.

Further details and advantages will be evident from the detailed description below.

The external dimensions and the shape of the frame according to the invention can be varied with respect to the application in question. However, the frame is generally essentially rectangular and has edge-to-edge measures between 0.2 and 2 m, preferably between 0.5 and 1.5 m. Other shapes can of course be considered in order to adapt the frame to a particular space, and it can be shaped as a disc so that it can rotate around its axis for periodical deposit and cleaning phases.

When corrugating the used plates, it should be taken into account that there should be between 5 and 30, preferably between 8 and 20, entire undulations on the total breadth of the frame, and this means that the length of the undulations may vary between frames of different sizes. The length of the undulations is preferably the same over the entire surface of the frame but if it varies, e.g. with radially extending ridges and valleys on a circular frame, care should be taken to shape the plates uniformly, so that a linear contact can be maintained.

The amplitude of the corrugations must not be too small as the flexibility then becomes too low and there will be a risk of compression of the surfaces of the cloth and besides this, the fluid percolation will be hampered. The amplitude must neither be too great as the peak curvature will diminish the flexibility of the frame. The amplitude should thus be 0.1 to 1.25 times the undulation length, and preferably 0.25 to 0.75 times this. The thickness of the frame will then be about the double amplitude plus an optional distance between the plates. Such a distance can be of use in order to establish contact between adjacent channels for filtrate in the frame, but should, for reasons of structural strength, not exceed one fifth of the amplitude and preferably not exceed one tenth of this. In order to obtain the best possible flexibility, the flexure of the corrugations should be even and not form a sharp ridge and a valley with essentially straight parts in between.

As a consequence of the inherent stability of the construction according to the invention, the plate from which the expanded metal is drawn can be fairly thin. The thickness is suitably within the range of from 0.5 to 3 mm and preferably within the range from 0.75 to 2 mm. The degree of linear expansion of the plate should be between 30 and 70, preferably between 40 and 60 percent. The distance between the slits should be from 2 to 20, preferably from 4 to 10 mm. It is preferred that the apertures are parallel to the corrugation lines.

The material in the net of expanded metal can be any metal which is capable of withstanding the treated medium but titanium metal has been found particularly suitable. Besides possessing good resistability in corrosive environments it can easily be transformed into expanded metal, fairly easily be welded and it possesses good strength, good flexibility and has a low weight which all make the material suitable for a design according to the invention, and particularly for being used for sludge filtration in chlorine/alkali industries where the filters are employed in a corrosive environment and where the deposited filter cake is difficult to remove.

After a couple of nets of expanded metal have been manufactured and corrugated to get the above defined properties, the two nets are placed against each other in such a manner that their surfaces are not parallel to each other at a constant distance, but are so displaced with respect to each other that the ridges of one are in contact with the valleys of the other and thus form contacts between the corrugations and form channels for the fluid between the contact lines. The plates can be held together in several different manners, e.g. by bolts, by a metal band around the frame or by means of the joining capability of end-parts along the edges of the frame. As has been mentioned above it is, however, preferred that a number of spot welds are made along the contact lines of the sections. As has been indicated above the joining can be made to form a slight distance between the plates at the contact lines, but the plates are preferably in direct contact with each other. A frame manufactured in this manner can immediately after having been further equipped with an outlet pipe be used in a filter bag and it shows good strength and flexibility.

It is preferred, however, as has been mentioned above, that at least one and preferably both of the edges of the frame, which are perpendicular to the contact lines, are equipped with end-parts in the form of a longitudinal plate. This is preferred partly to protect the filter bag against sharp edges which may be formed on the net of expanded metal, and partly to further stabilize the external dimensions of the frame. It is suitable to design at least one of the end-parts to encompass a collecting space for the filtrate, to which space the outlet pipe can be connected. The end-part can be shaped as a pipe along the edge, which pipe in some manner is opening out to the channels, e.g. by shaping it as a trough. In order to use the filtering area of the filter to the greatest possible extent, the end-part is suitably also made of perforated plate, preferably of expanded metal, whereby spot welding also in this case can be employed as a method of joining. Between the end-parts the width of the frame is somewhat less satisfactorily stabilized, and at higher demands on accuracy as to size and particularly for frame constructions of larger dimensions it is therefore preferred that one or several bands are used and fixed between the corrugated nets which are placed against each other, parallel to and between the end-parts. Suitably the bands are joined to the nets at a plurality of points and preferably at all the places where the bands pass across the contact lines between the nets and the joining is preferably made by spot welding.

Should the sides of the frame which are parallel to the contact lines between the nets have sharp edges, these sides can advantageously be equipped with means for protection, suitably by means of plates or nets of expanded metal which have been given a U-shaped profile. Spot welding can also in this case be used as the method of joining.

The filter bag, which is made of a material resistant to the environment in question, should preferably be of larger size than the filter frame, and it is suitably insignificantly larger than the frame in the direction along the undulation lines, while it in the other direction has a greater length than the length of the frame, but shorter than what is required for the cloth to entirely follow the plate and go to the bottoms of the valleys. It is suitably between 5 and 20 percent shorter than the length of the plate, and preferably between 10 and 15 percent shorter. No means for holding or similar devices should be arranged on the outer side of the cloth not to hinder the inflation and bending outwards of the cloth at reverse flushing, whereby the separating effect becomes best. The cloth should be provided with openings both in order to make it possible to slip it on to the frame and to give a lead-through for the outlet pipe. Since the frame of the invention is a rigid construction which cannot be folded, the filter bag must have an opening, the length of which corresponds to at least one side of the frame. It must, after insertion of the frame, be possible to close the opening tightly and this can be made in any known manner but it is preferred that the cloths are provided with zip fasteners of known kind for filter bags, as these both can be made tight and admit a simple procedure for fitting on and taking off. When the opening for insertion of the frame has been sealed, there must be a smaller opening for the outlet pipe from the interior of the filter to the environment. It is simplest to design this opening as a cuff around the outlet pipe, which cuff can be sealed by a tie or by other ways of tightening.

The unit comprising a frame and filter bag is intended to be fitted into a vessel to which is brought the fluid to be treated, and which fluid under influence of a pressure difference percolates the filter bag, flows through the frame to the outlet pipe and via this out of the vessel.

Normally a number of filter units are arranged in the same vessel e.g. 15 to 40 units, and it is then required that they can be fitted in a stable manner and at a fairly constant distance from each other, and this at the same time in a manner which permits a simple dismantling, so that they can be taken out for replacement of the filter cloths and for other kinds of servicing. The filter unit of the invention is suitably suspended from the outlet pipe, which then suitably is arranged at the top of the filter unit. In those cases wherein the frame has an end-part designed as a pipe connected to the outlet pipe the end-part can easily be extended in the direction opposite to the outlet pipe and be used as further means of suspending, if required. Cleaning is carried out by reverse flushing of the filtrate or of other specially fed medium, optionally also by feeding a flow to the outside of the cloths. The filter units shall be arranged at such a distance from each other that the filter cloths can freely be bent out and inflated for removal of the filter cake. The vessel should preferably be equipped with means for removal of the detached material.

The construction according to the invention can be used for filtration of gases but it is particularly suitable for filtration of fluids.

Figure 3:
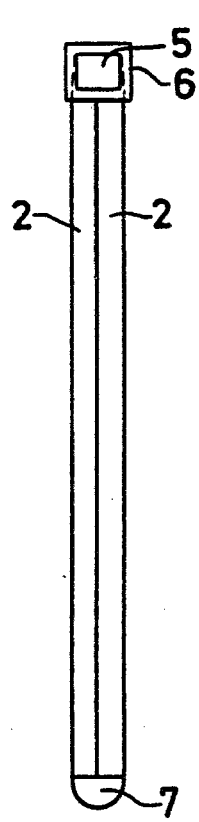
Figure 4:
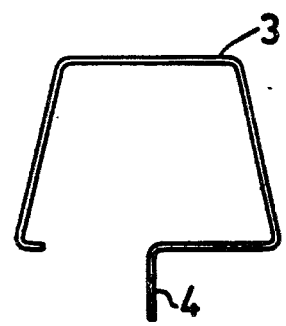
Figure 5:
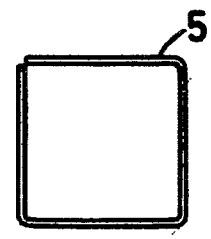

A preferred embodiment of the frame of the invention will be described in some detail below, with reference to the accompanying drawings. In the drawings FIG. 1 shows a front view of the frame, FIG. 2 shows a cross-section through the corrugated plates of the frame, FIG. 3 is a sectional view of the frame, FIG. 4 shows an upper end-part on the frame for filtrate collection, FIG. 5 is a cross-section through the outlet pipe and FIG. 6 a lower end-part on the frame.

Figure 2:
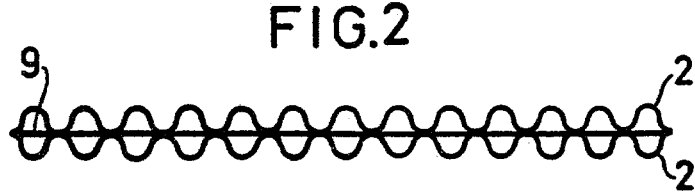
Figure 6:
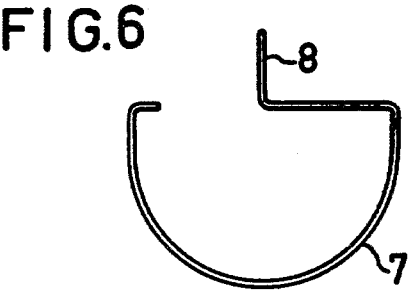

In the figures position 1 shows the main part of the frame, which comprises two corrugated plates 2, made of expanded metal and placed against each other, this is best evident from FIG. 2. An upper filtrate collecting end-part 3 is affixed to the part 1. This is also made of expanded metal and has a cross-section according to FIG. 4. The part 4 which is bent downwards is inserted between the plates 2 and spot welded to these. The part 3 is at one end extended to form a support organ while in its other end an outlet pipe 5, made of non-perforated material, is inserted, the pipe has a cross-section as shown in FIG. 5 and is provided with a flange 6, at the end directed from the filtrate, for connection with a filtrate collecting conduit. The lower part of the frame 1 is provided with a lower end-part 7 of expanded metal, the profile thereof is shown in FIG. 6, and which like the upper part 3 has a part 8 which is bent upwards and which is inserted and fixed between the plates 2. The continuous line 9 in FIG. 2 indicates bands which are fixed between the nets 2, parallel to and at a distance from the end-parts 3 and 7 for stabilizing the external dimensions of the frame also at these spots.

The invention is not limited to the described embodiments but can be modified within the scope of the following claims.

We claim:

1. In the combination of a filter cloth shaped as a bag and a filter frame positioned within the bag so as to keep the sides of the cloth bag from contacting each other, the improvement consisting of a flexible filter frame having a thickness that can be temporarily compressed during the filtration operation, said flexible filter frame comprising:

(a) a first corrugated plate having ridges and valleys, (b) a second corrugated plate having ridges and valleys, (c) said first and second corrugated plates
being composed of a network of expanded metal,
being free of sharp ridges and valley folds,
being secured to each other in such a manner that the ridges of one plate are in linear contact with the valleys of the other plate so as to thereby form a plurality of parallel channels for the filtrate between adjacent linear contact lines, (d) an outlet passageway for filtrate in the form of a discharge tough, said discharge trough connecting the ends of said channels for receiving filtrate flow from said channels, said discharge trough extending along the edges of the plates transversely to the longitudinal axes of said channels, said discharge trough being made of the same expanded metal as said corrugated plates, and (e) a pipe for connecting the end of said discharge trough to a collection means for said filtrate.

2. A combination according to claim 1 wherein said expanded metal corrugated plate:

has between 5 and 30 undulations, has a thickness of 0.5 to 3 mm, has a distance between slits of 2–20 mm, has a degree of linear expansion of between 30 and 70%, and is composed of titanium metal.

* * * * *